(12) United States Patent
Kotaka

(10) Patent No.: US 10,016,992 B2
(45) Date of Patent: Jul. 10, 2018

(54) PRINTING APPARATUS AND CONTROL METHOD FOR THE PRINTING APPARATUS

(71) Applicant: SEIKO EPSON CORPORATION, Tokyo (JP)

(72) Inventor: Toshikazu Kotaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/484,393

(22) Filed: Apr. 11, 2017

(65) Prior Publication Data
US 2017/0313106 A1    Nov. 2, 2017

(30) Foreign Application Priority Data
Apr. 27, 2016    (JP) ................................ 2016-088881

(51) Int. Cl.
*B41J 25/00*    (2006.01)
*B41J 2/01*    (2006.01)

(52) U.S. Cl.
CPC ............... *B41J 25/006* (2013.01); *B41J 2/01* (2013.01)

(58) Field of Classification Search
CPC ... B41J 25/006; B41J 2/01; B41J 11/04; B41J 11/006; B41J 3/60; B41J 29/13; B65H 29/60; B65H 29/58; B65H 3/06; B65H 3/0638
See application file for complete search history.

(56) References Cited

U.S. PATENT DOCUMENTS

| | | | |
|---|---|---|---|
| 8,837,988 B1* | 9/2014 | Hara | B41J 29/54 399/125 |
| 2011/0135364 A1* | 6/2011 | Takuwa | G03G 15/6552 399/405 |
| 2015/0274477 A1 | 10/2015 | Kodama | |

FOREIGN PATENT DOCUMENTS

| | | |
|---|---|---|
| JP | 10-324444 A | 12/1998 |
| JP | 2015-189006 A | 11/2015 |

* cited by examiner

*Primary Examiner* — Juanita D Jackson

(57) ABSTRACT

A printer includes a printing unit, a casing, a scanner unit disposed in an upper portion of the casing, and a discharge unit that, below the scanner unit, is connected to the casing pivotably between a closed position and an open position and that a sheet of paper is discharged to. The discharge unit includes a placement surface for the sheet and a medium support unit capable of supporting the sheet from below while in a state of being protruded from the placement surface. The medium support unit is displaceable between a maximum protruded position and a minimum protruded position. When the amount of protrusion of the medium support unit from the placement surface when the discharge unit is in the open position is less than the amount of protrusion of the medium support unit in the maximum protruded position from the placement surface.

9 Claims, 10 Drawing Sheets

PRINTING APPARATUS AND CONTROL METHOD FOR THE PRINTING APPARATUS

CROSS REFERENCES TO RELATED APPLICATIONS

The entire disclosure of Japanese Patent Application No. 2016-088881; filed Apr. 27, 2016 is expressly incorporated by reference herein.

BACKGROUND

1. Technical Field

The present disclosure relates to a printing apparatus that has, below a scanner unit in a vertical direction, a discharge unit to which a printed medium is discharged.

2. Related Art

As a type of printing apparatus, an ink jet type printer that performs printing on a sheet of paper as a medium by supplying an ink (liquid) to a print head (liquid ejecting head) and ejecting the ink from a nozzle formed on the print head has been widely known. Among such printers there is a printer that has, below a scanner unit in a vertical direction, a discharge unit to which a printed sheet of paper is discharged (see, e.g., JP-A-2015-189006). In the printer described in JP-A-2015-189006, the discharge unit is pivotably connected to a casing of the printer. Therefore, by pivoting the discharge unit, an interior of the printer can be exposed so that a maintenance operation, such as removal of jammed paper inside the printer, can be carried out.

In a printer such as an ink jet type printer, it sometimes happens that a printed sheet of paper curls when dried. Therefore, in order to inhibit such curling of a sheet of paper, the printer of JP-A-2015-189006 has a protruded portion at a site that corresponds to a central portion of a sheet of paper in the discharge unit in a transverse direction of the sheet.

Furthermore, in a printing apparatus whose discharge unit is pivotable, the pivot range of the discharge unit is restricted by interference of the discharge unit with the scanner unit. Particularly, in the case where the discharge unit is provided with a protruded portion for inhibiting a printed sheet from curling, this protruded portion comes into contact with the scanner unit, so that the pivot range of the discharge unit is further reduced. This leads to a problem that, for example, even after pivoting the discharge unit, a user may find it hard to check an interior of the printer or perform an operation for maintenance.

SUMMARY

An advantage of some aspects of the disclosure is that a printing apparatus that allows a user to easily perform maintenance is provided.

Constructions of the disclosure and advantageous effects thereof will be described below.

A printing apparatus according to one aspect of the disclosure includes a printing unit that performs printing on a medium, a casing that houses the printing unit, a scanner unit disposed in an upper portion of the casing, and a discharge unit that is disposed below the scanner unit in a vertical direction, and that is connected to the casing pivotably between a closed position in which the discharge unit is farthest from the scanner unit and an open position in which the discharge unit is nearer to the scanner unit than in the closed position, and that the medium having been subjected to printing by the printing unit is discharged to. The discharge unit includes a placement surface on which the medium is put and a medium support unit capable of supporting the medium from below while in a state of being protruded from the placement surface. The medium support unit is displaceable between a maximum protruded position in which amount of protrusion of the medium support unit from the placement surface is largest and a minimum protruded position in which the amount of protrusion of the medium support unit from the placement surface is smallest. The amount of protrusion of the medium support unit from the placement surface when the discharge unit is in the open position is less than the amount of protrusion of the medium support unit in the maximum protruded position from the placement surface.

In a case where the discharge unit is provided with a portion protruded upward from the placement surface, this protruded portion interferes with the scanner unit and therefore restricts the pivot range of the discharge unit. However, in the foregoing construction according to the disclosure, the amount of protrusion of the medium support unit protrudable from the placement surface which is measured from the placement surface when the discharge unit is in the open position is less than the maximum amount of protrusion. The amount of protrusion of the medium support unit reduced in this manner correspondingly increases the pivot range of the discharge unit. This makes it easier for a user to perform maintenance.

The foregoing printing apparatus may further include a pinion connected to the casing, a rack that is movably connected to the discharge unit and that comes out of mesh with the pinion when the discharge unit is pivoted from the closed position to the open position, and a coordination mechanism unit that includes, in a mechanism that coordinates the rack and the medium support unit, a first engaging portion that engages with the rack and a second engaging portion that, above the first engaging portion in the vertical direction, engages with the medium support unit. In this construction, the first engaging portion and the second engaging portion move relative to each other in a protruding direction of the medium support unit from the placement surface as the rack moves. When the discharge unit is in the closed position, the amount of protrusion of the medium support unit changes as the rack is moved with rotation of the pinion so that the first engaging portion and the second engaging portion are moved relative to each other. When the discharge unit is in the open position, the amount of protrusion of the medium support unit becomes smaller as the rack out of the mesh with the pinion moves based on load from the medium support unit so that the first engaging portion and the second engaging portion are relatively moved in such a direction that distance between the first engaging portion and the second engaging portion becomes smaller.

According to this construction, when the discharge unit is in the closed position, the amount of protrusion of the medium support unit can be adjusted because the rack moves with rotation of the pinion so that the distance between the first engaging portion and the second engaging portion of the coordination mechanism unit changes. On the other hand, when the discharge unit is in the open position, the amount of protrusion of the medium support unit becomes smaller because the rack, which has come out of mesh with the pinion, moves on the basis of the load from the medium support unit and therefore operates the coordination mechanism unit so that the distance between the first engaging portion and the second engaging portion becomes smaller. Therefore, there is no particular need to provide a mechanism that, for example, detects the position of the discharge unit and, on the basis of the detection signal, drives an actuator so as to adjust the amount of protrusion of the medium support unit. Hence, the apparatus construction can be simplified.

Furthermore, in the printing apparatus, the pinion may be disposed below the placement surface in the protruding direction of the medium support unit, at a location to the downstream side of the medium support unit in the transport direction of the medium.

According to this construction, the pinion is disposed to the downstream side of the medium support unit in the transport direction along the placement surface. That is, since the pinion is disposed toward an end of the placement surface, this construction is less likely to restrict arrangement of members disposed below the placement surface.

Furthermore, in the printing apparatus, the open position may include a maximum open position in which the discharge unit is nearest to the scanner unit. The casing may include a side wall that is located to the upstream side of the discharge unit in the transport direction of the medium and that has a discharge opening through which the medium is discharged to the discharge unit. The medium support unit may include an upstream-side end portion at a nearest side of the medium support unit to the discharge opening. The placement surface may have an upstream-side portion that is adjacent to the upstream-side end portion. The largest amount of protrusion of the upstream-side end portion may be larger than the distance between the side wall and the upstream-side portion in the protruding direction of the medium support unit when the discharge unit is in the maximum open position.

The farther the upstream-side end portion of the medium support unit is from the side wall that has the discharge opening, the less the effect of the medium support unit in inhibiting the curling of an upstream-side end portion of the medium. On the other hand, when the upstream-side end portion of the medium support unit is near the side wall, there is a risk that the upstream-side end portion of the medium support unit may interfere with the side wall when the discharge unit is pivoted and therefore the pivot range of the discharge unit may become smaller.

In this respect, according to the foregoing construction, the maximum amount of protrusion of the upstream-side end portion of the medium support unit which, of the medium support unit, is the nearest to the discharge opening is larger than the distance between the side wall and the upstream-side portion of the placement surface which is adjacent to the upstream-side end portion of the medium support unit when the discharge unit is in the maximum open position. Therefore, by reducing the amount of protrusion of the medium support unit when the discharge unit is in the maximum open position, it becomes possible to bring the medium support unit close to the side wall and, at the same time, substantially prevent the pivot range of the discharge unit from becoming smaller.

Further, in the printing apparatus, the casing may have, to the downstream side of the medium support unit in the transport direction of the medium, a medium contact portion that is protruded upward from the placement surface.

According to this construction, even a large-size medium whose downstream-side end portion reaches a location downstream of the medium support unit after printing is performed can be supported by the medium contact portion. Therefore, the downstream-side end portion of the medium is inhibited from curving.

A printing apparatus according to another aspect of the disclosure includes a printing unit that performs printing on a medium, a casing that houses the printing unit, a scanner unit disposed in an upper portion of the casing, a discharge unit that is disposed below the scanner unit in a vertical direction, and that is connected to the casing pivotably between a closed position in which the discharge unit is farthest from the scanner unit and an open position in which the discharge unit is nearer to the scanner unit than in the closed position, and that includes a placement surface on which the medium having been subjected to printing by the printing unit is put after being discharged and a medium support unit that is capable of supporting the medium from below while in a state of being protruded from the placement surface, and an adjustment mechanism that changes the amount of protrusion of the medium support unit from the placement surface. When the discharge unit is in the closed position, the amount of protrusion of the medium support unit is changed by the adjustment mechanism. When the discharge unit is in the open position, the amount of protrusion is reduced by external force.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Hereinafter, a printer as a printing apparatus will be described with reference to the drawings.

Figure 1:
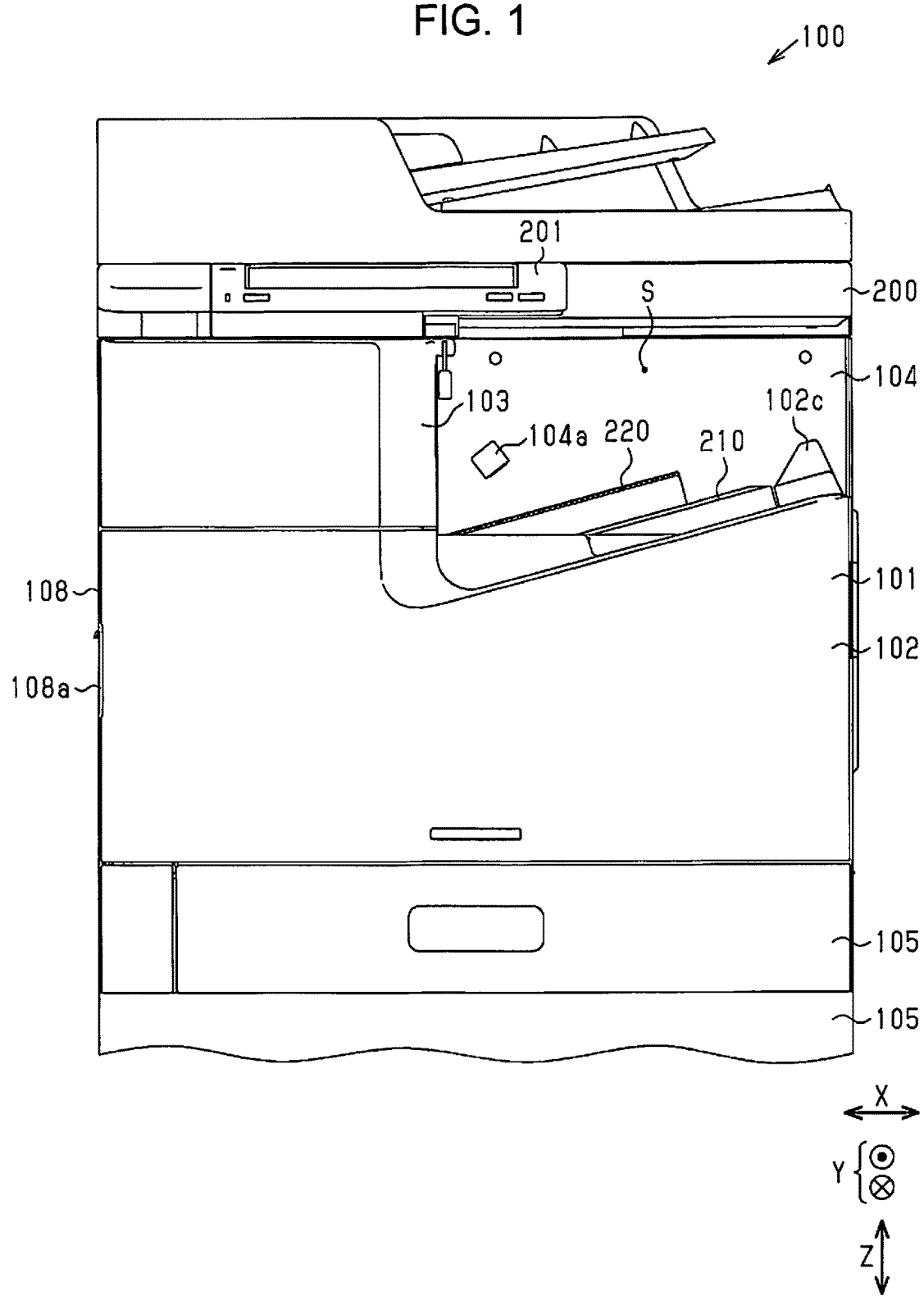
FIG. 1 is a front view of a printer as a printing apparatus.

As shown in FIG. 1, a printer 100 is an ink jet type printer that prints images, such as characters and photographs, on a sheet P as a medium by depositing on the sheet P ink as an example of liquid and that is housed in a rectangular parallelepiped casing 101. In upper portions of the casing 101 in vertical directions Z there are disposed a scanner unit 200 and an operating unit 201 for causing the printer 100 to perform various operations.

The printer 100 includes sheet cassettes 105 provided in central to lower portions of the printer 100 in the vertical directions Z. The sheet cassettes 105 are aligned in the vertical directions Z. Each sheet cassette 105 houses stacked sheets P on each of which the printer 100 performs printing. Each sheet cassette 105 is insertable into and removable from the casing 101 in front-rear directions Y that intersect both the vertical directions Z and a transport direction W of the sheets P. Incidentally, the sheet cassettes 105 may house the same or different types of sheets P.

Figure 2:
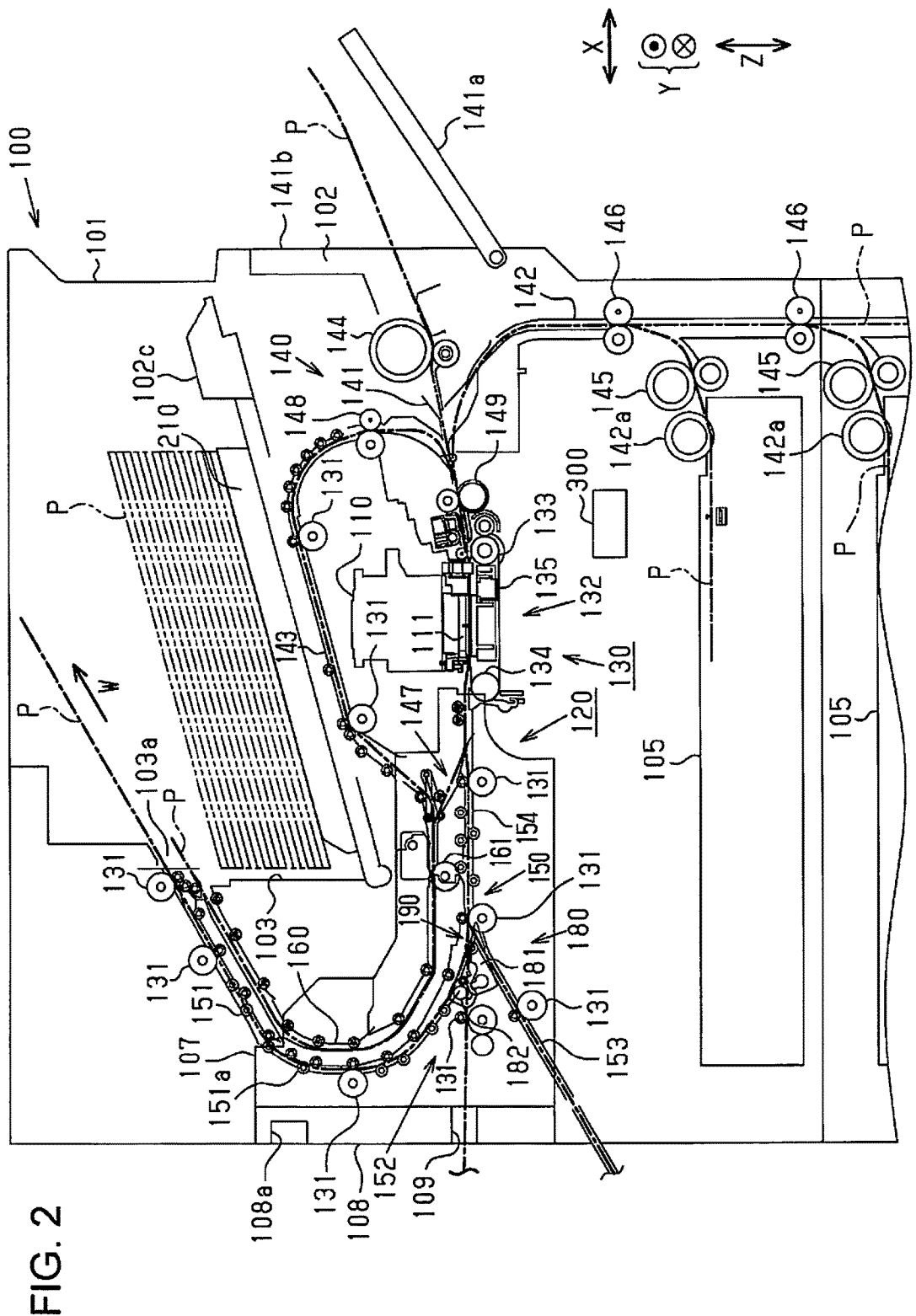
FIG. 2 is a schematic structure diagram of a printer.

As shown in FIG. 2, a left side surface of the printer 100 that is on the left side in FIG. 2 is provided with a drawer face portion 108 that can be drawn out from the casing 101. An upper portion of the drawer face portion 108 in the vertical directions Z is provided with a handhold portion 108a on which a user can hook the user's hand. When the drawer face portion 108 is drawn out from the casing 101 along a drawing direction that is the left direction in terms of the transport direction W, a movable unit 107 is drawn out from the casing 101 in an interlocked manner. Furthermore, the drawer face portion 108 has a discharge opening 109 through which a printed sheet P is discharged out. The discharge opening 109 is formed at a location under the handhold portion 108a in the vertical directions Z. The discharge opening 109 is provided with a sheet discharge tray.

Next, a structure of the printer 100 will be described.

The printer 100 is housed in the casing 101 and includes a printing unit 110 that performs printing on a sheet P from an upper side in the vertical directions Z and a transport unit 130 that transports the sheet P along a transport path 120. The transport path 120 is formed so that the sheet P is transported along the transport direction W that intersects transverse directions of the sheet P that are assumed to be along the front-rear directions Y. The sheet P is transported along the transport path 120 so that a center of the sheet P in the transverse directions coincides with a center line of the transport path 120.

The printing unit 110 has in a lower portion thereof a line head-type print head 111 capable of discharging ink simultaneously over substantially the entire area of the sheet P in the transverse directions. The printing unit 110 forms an image on the sheet P as the ink discharged from the print head 111 adheres to a printed surface of the sheet P which faces the print head 111 (a surface on which an image is printed).

The transport unit 130 includes a plurality of transport roller pairs 131 disposed along the transport path 120 and a belt transport unit 132 provided immediately under the printing unit 110. That is, the ink is discharged from the print head 111 onto the sheet P transported by the belt transport unit 132, thus carrying out printing.

The belt transport unit 132 includes a driving roller 133 disposed to an upstream side of the print head 111 in the transport direction W, a driven roller 134 disposed to the downstream side of the print head 111 in the transport direction W, and an endless annular belt 135 wrapped around these rollers 133 and 134. As the driving roller 133 is rotationally driven so as to turn the belt 135. The thus-rotating belt 135 transports the sheet P to the downstream side. Specifically, an outer peripheral surface of the belt 135 functions as a support surface that supports the sheet P on which printing is performed.

The transport path 120 includes a feed path 140 along which the sheet P is transported toward the printing unit 110, a discharge path 150 along which the printing unit 110 performs printing and the printed sheet P is transported, and a branch path 160 branching from the discharge path 150.

The feed path 140 includes a first feed path 141, a second feed path 142, and a third feed path 143. The first feed path 141 transports to the printing unit 110 a sheet P inserted from an insertion opening 141b that is exposed by opening a sheet feed cover 141a provided in a right side surface of the casing 101. The first feed path 141 is provided with a first driving roller pair 144. Due to the rotational driving of the first driving roller pair 144, the sheet P inserted from the insertion opening 141b is linearly transported toward the printing unit 110.

The second feed path 142 transports to the printing unit 110 a sheet P housed in a selected one of the sheet cassettes 105 disposed in lower portions of the casing 101 in terms of the vertical directions Z. Portions of the second feed path 142 near the sheet cassettes 105 are each provided with a pickup roller 142a and a separator roller pair 145. Sheets P housed in a stacked state in the sheet cassettes 105 are fed out as follows. That is, uppermost sheets P in a sheet cassette 105 are sent out by the pickup roller 142a and are separated one at a time by the separator roller pair 145. After that, the sheet P is inverted in posture in the vertical directions Z and then is transported toward the printing unit 110 by the rotational driving of second driving roller pairs 146 that are provided on the second feed path 142.

The third feed path 143 transports to the printing unit 110 a sheet P one side of which has been subjected to printing by the printing unit 110 in the case where the sheet P is subjected to two-side printing that prints images on both sides of the sheet P. Specifically, at the downstream side of the printing unit 110 along the transport direction W there is a branch path 160 branching from the discharge path 150. When two-side printing is performed, the sheet P is transported into the branch path 160 by operation of a branching mechanism 147 that is provided at a halfway point along the discharge path 150. Furthermore, the branch path 160 is provided with a branch path roller pair 161 capable of both forward and reverse rotations. The branch path roller pair 161 is disposed to the downstream side of the branching mechanism 147.

During the two-side printing, the sheet P one side of which has been printed is guided temporarily into the branch path 160 by the branching mechanism 147 and transported downstream along the branch path 160 by the branch path roller pair 161 undergoing forward rotations. After being transported into the branch path 160, the sheet P is reversely transported from the downstream side to the upstream side along the branch path 160 by the branch path roller pair 161 undergoing reverse rotations.

The sheet P reversely transport from the branch path 160 is transported into the third feed path 143 and is transported toward the printing unit 110 by a plurality of transport roller pairs 131 The third feed path 143 extends around the printing unit 110 and joins the first feed path 141 and the second feed path 142 at the upstream side of the printing unit 110. Therefore, because of being transported along the third feed path 143, the sheet P is inverted so that the other surface thereof, that is, the surface not having been subjected to printing, faces the printing unit 110, and is transported toward the printing unit 110 by the rotational driving of a third driving roller pair 148. That is, the third feed path 143 functions as an inverting transport path that transports the sheet P while inverting the posture of the sheet P in the vertical directions Z.

Of the feed paths 141, 142 and 143, the second feed path 142 and the third feed path 143 transport the sheet P toward the printing unit 110 while curving the posture of the sheet P in the vertical directions Z. On the other hand, the first feed path 141 transports the sheet P toward the printing unit 110 without considerably curving the posture of the sheet P in comparison with the second feed path 142 and the third feed path 143.

The sheet P transported along any one of the feed paths 141, 142 and 143 is transported to a register roller pair 149 disposed at the upstream side of the printing unit 110 in the transport direction W, and then a leading end of the sheet P comes into pressing contact with the register roller pair 149, whose rotation has been stopped. Then, as the sheet P is in pressing contact with the register roller pair 149, the skew of the sheet P with respect to the transport direction W is corrected (skew removal). After skew correction, the sheet P is transported to the printing unit 110 while being in a registered state by the rotational driving of a downstream located register roller pair 149.

After the sheet P is subjected to one-side or two-side printing by the printing unit 110 and thus completely undergoes printing, the sheet P is transported by the transport roller pairs 131 along the discharge path 150, which constitutes a downstream portion of the transport path 120. The discharge path 150 branches into a first discharge path 151, a second discharge path 152, and a third discharge path 153, at a location downstream of a location of branching into the branch path 160. That is, after printing is completed, the sheet P is transported along a common discharge path 154 that constitutes an upstream portion of the discharge path 150. Then, by a guide mechanism 180 provided at a downstream end of the common discharge path 154, the sheet P is guided to one of the first to third discharge paths 151, 152 and 153, which constitute a downstream portion of the discharge path 150.

The first discharge path 151 extends toward an upper portion of the casing 101 and is curved along the branch path 160. The sheet P transported along the first discharge path 151 is discharged from a discharge opening 103a that has an opening in a portion of the casing 101 which forms a terminal end of the first discharge path 151. After being discharged from the discharge opening 103a, the sheet P falls downward in the vertical directions Z. Thus, as indicated by two-dot chain lines in FIG. 2, sheets P are discharged in a discharge unit 210, forming a stacked state. Incidentally, by the transport roller pairs 131 disposed at a plurality of sites along the discharge path 150, the sheet P is discharged from the discharge opening 103a into the discharge unit 210, in such a manner that its printed surface in the case of one-side printing faces down in the vertical directions Z.

Furthermore, the first discharge path 151 includes a curved path 151a that inverts the sheet P so that the upper and lower surfaces of the sheet P are reversed, while the sheet P having been subjected to printing by the printing unit 110 is transported to the discharge opening 103a. The curved path 151a curves the sheet P having been subjected to printing by the printing unit 110 so that the printed surface thereof faces inward and therefore inverts the sheet P from a state in which the printed surface faces vertically upward in the vertical directions Z to a state in which the printed surface faces downward in the vertical directions Z. Therefore, along the discharge path 150, the sheet P, passing through the curved path 151a, comes to assume a state in which the printed surface in the case of one-side printing faces the discharge unit 210 and then is discharged from the discharge opening 103a. Furthermore, at the time of two-side printing, the sheet P is discharged from the discharge opening 103a in a state in which the earlier printed surface of the sheet P faces upward and the immediately previously printed surface faces the discharge unit 210.

The second discharge path 152 branches to a lower side of the first discharge path 151 in the vertical directions Z and linearly extends from the printing unit 110 toward the drawer face portion 108 that forms a portion of the casing 101. Therefore, the sheet P transported along the second discharge path 152 is not transported in a curved posture as along the first discharge path 151 but linearly transported in an unchanging posture similar to the posture assumed during passage through the printing unit 110 and discharged from the discharge opening 109 formed in the drawer face portion 108. That is, the second discharge path 152 functions as a non-inverting discharge path that discharges sheets P without inverting the posture of the sheets P in the vertical directions. The third discharge path 153 branches to a lower side of the second discharge path 152 in the vertical directions Z and extends obliquely downward in the vertical directions Z toward a lower portion of the casing 101. The third discharge path 153 can be connected to a post-processing apparatus that performs, for example, the drying or sorting of sheets P.

A portion of the discharge path 150 and a portion of the branch path 160 are provided in a movable unit 107 provided in the casing 101. That is, the movable unit 107 includes portions of the transport path 120. This movable unit 107 is connected to the drawer face portion 108 so that the movable unit 107 and the drawer face portion 108 can be handled together as one body. Therefore, as the drawer face portion 108 is drawn out, the movable unit 107 is also drawn out of the casing 101 and exposed out of the casing 101. Therefore, paper jam or the like inside the transport path 120 provided in the movable unit 107 can be removed.

A guide mechanism 180 includes a first guide unit 161 and a second guide unit 182. The guide units 181 and 182 are provided at a branching location 190 at which the first to third discharge paths 151, 152 and 153 branch from a downstream end of a common discharge path 154 and are shifted in position from each other so that the first guide unit 181 is at the right side in FIG. 2, which is the upstream side in the transport direction W of the sheet P from the printing unit 110, and the second guide unit 182 is at the left side in FIG. 2, which is the downstream side. Furthermore, the first guide unit 181 and the second guide unit 182 are also shifted in position in the vertical directions Z so that the first guide unit 181 is at the lower side and the second guide unit 182 is at the upper side.

Furthermore, each guide unit 181, 182 is pivotable about a shaft (not depicted) provided in a proximal end portion thereof that is a left portion in FIG. 2, which is a downstream-side portion in the transport direction W. As each guide unit 181, 182 is pivoted about its shaft, a distal end portion thereof at the opposite side to the proximal end portion which is a right portion in FIG. 2, which is the upstream-side portion in the transport direction W, is displaced up and down in terms of the position in the vertical directions Z. That is, each guide unit 181, 182 is provided so as to be freely pivotable between two positions that are an upper position in which the distal end portion of the guide unit located at the upstream side in the transport direction of the sheet P comes to an upper position and a lower position in which the distal end portion of the guide unit comes to a lower position. Incidentally, the distal end portion of the first guide unit 181 is located further upstream in the transport direction W of the sheet P than the distal end portion of the second guide unit 182.

The guide units 181 and 182 are each selectively switched between the upper position and the lower position to accordingly contact the sheet P transported along the common discharge path 154 and guide the sheet P to one of the first to third discharge paths 151, 152 and 153. Incidentally, the pivot operation of each guide unit 181, 182 is controlled by a control unit 300 provided in the printer 100.

Figure 3:
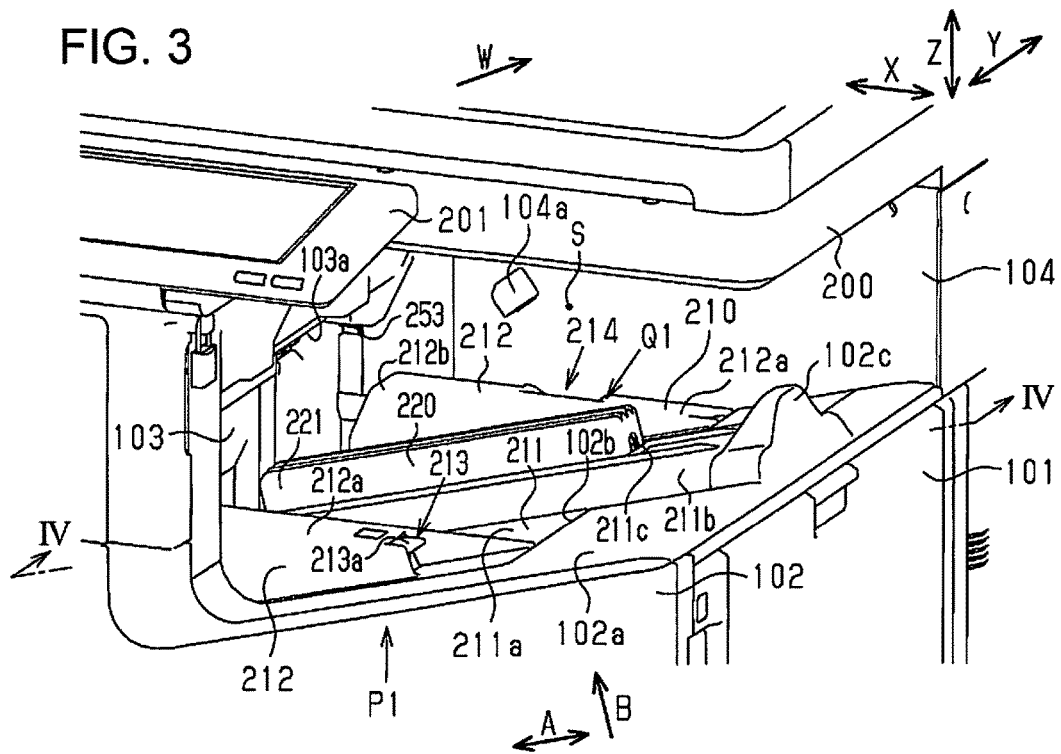
FIG. 3 is a perspective view of the printer when a discharge unit is in a closed position and a medium support unit is in a maximum protruded position.

As shown in FIG. 3, the casing 101 includes a main body portion 102 that covers an outer perimeter of the printing unit 110, a side wall 103 extending upward in the vertical directions Z from the main body portion 102, and a support wall 104 extending upward in rear of the side wall 103 in the front-rear directions Y. The side wall 103 is disposed in an intermediate portion of the main body portion 102 in left-right directions X orthogonal to both the vertical directions Z and the front-rear directions Y. The side wall 103 is provided with the discharge opening 103a that communicates with the second discharge path 152 (see FIG. 2) and through which the sheet P transported from the second discharge path 152 is discharged. The scanner unit 200 is mounted above the support wall 104 in the vertical directions Z. A front end portion of the scanner unit 200 in the front-rear directions Y is located further forward than the support wall 104, and is supported by the side wall 103. That is, the scanner unit 200 is supported by the support wall 104 and the side wall 103.

The scanner unit 200, the support wall 104, the side wall 103, the main body portion 102 of the casing 101 surround a space S in which the discharge unit 210 to which a sheet P printed by the printing unit 110 is discharged is disposed. The side wall 103 is located to the upstream side of the discharge unit 210 in the transport direction W of the sheet P. The discharge unit 210 is provided at an opening 102b formed in a top wall 102a of the main body portion 102 which defines a bottom portion of the space S. The top wall 102a has, at a location to a downstream side of the opening 102b in the transport direction W, a medium contact portion 102c that is protruded upward in the vertical directions Z.

The discharge unit 210 includes a platy main body portion 211 on which sheets P are placed, restriction portions 212 that restrict movements of the sheets P in the front-rear directions Y orthogonal to the transport direction W, and a medium support unit 220.

Figure 4:
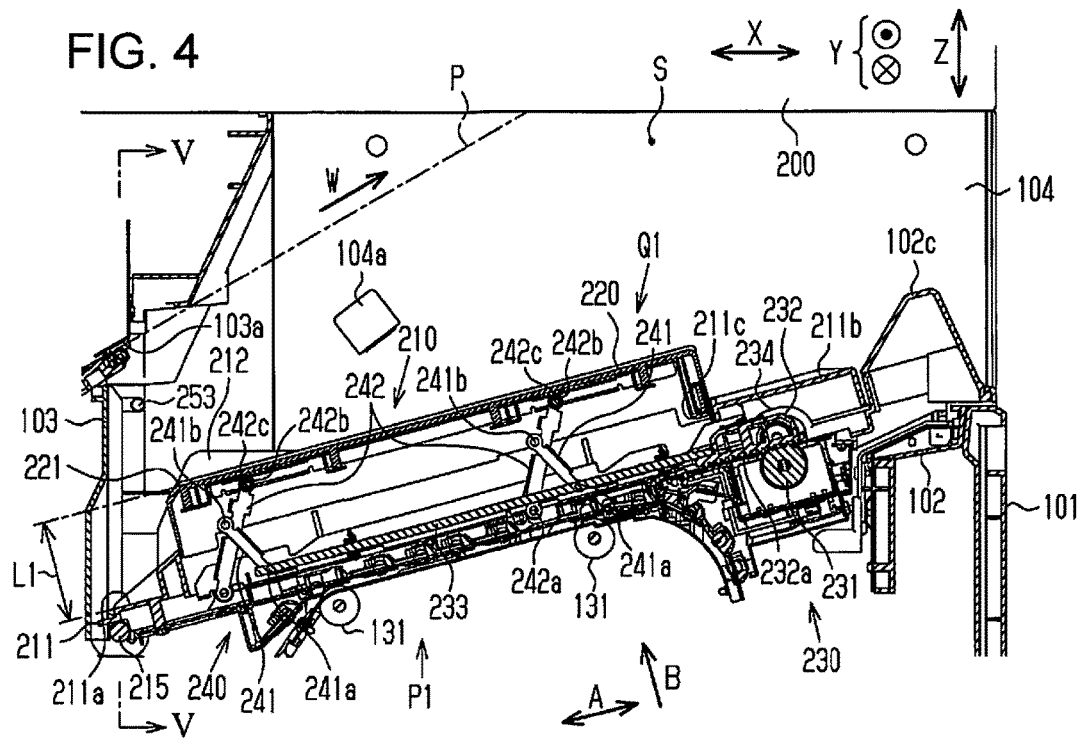
FIG. 4 is a sectional view taken on line IV-IV in FIG. 3.

As shown in FIG. 4, an upstream-side end portion of the discharge unit 210 in the transport direction W is pivotably connected to the main body portion 102 of the casing 101 via a pivot shaft 215. The discharge unit 210 is pivotable between a closed position P1 in which a downstream-side end portion thereof in the transport direction W is positioned furthest downward in the vertical directions Z and an open position P2 (see FIG. 10) in which the downstream-side end portion in the transport direction W is positioned above the closed position P1. The discharge unit 210 is disposed below the scanner unit 200 in the vertical directions Z. Therefore, the downstream-side end portion of the discharge unit 210 in the transport direction W is farthest from the scanner unit 200 when the discharge unit 210 is in the closed position P1, and is near to the scanner unit 200 when the discharge unit 210 is in the open position P2 than when the discharge unit 210 is in the closed position P1. That is, the discharge unit 210 is connected to the casing 101 so as to be pivotable between the closed position P1, which is the farthest from the scanner unit 200, and the open position P2, which is nearer to the scanner unit 200 than the closed position P1 is. The open position P2 includes a maximum open position P2 in which the discharge unit 210 becomes nearest to the scanner unit 200.

The main body portion 211 of the discharge unit 210 includes a placement surface 211a which faces the sheet P and on which the sheet P is put. When the discharge unit 210 is in the closed position P1, the main body portion 211 slopes upward in the vertical directions Z from the upstream side, which is the side of the discharge opening 103a formed in the side wall 103, to the downstream side in the transport direction W. The placement surface 211a of the main body portion 211 shown in FIG. 3, which is a space S-side surface thereof, is formed so as to be continuous with a top surface of the top wall 102a of the main body portion 102 when the discharge unit 210 is in the closed position P1. Therefore, the medium contact portion 102c provided on the top wall 102a of the casing 101 is protruded upward from the placement surface 211a at the downstream side of the medium support unit 220 in the transport direction W of the sheet P.

The restriction portions 212 are disposed at both sides of the sheet P in the transverse directions (front-rear directions Y). The restriction portions 212 extend in the left-right directions X and are protruded upward from the main body portion 211 in the vertical directions Z. A top surface 212a of each restriction portion 212 is along the front-rear directions Y when the discharge unit 210 is in the closed position P1. The front one of the restriction portions 212 in the front-rear directions Y is provided with an operating portion 213a of a closure-side engaging portion 213 for operating a hook 213b (see FIG. 10) that engages the discharge unit 210 and the main body portion 102 with each other when the discharge unit 210 is in the closed position P1. The rear-side restriction portion 212 in the front-rear directions Y is provided with an open-side engaging portion 214 that engages with a passive engagement portion 104a of the support wall 104 when the discharge unit 210 is in the maximum open position P2 (see FIG. 11). The open-side engaging portion 214 and the passive engagement portion 104a include magnets capable of engaging with each other.

As shown in FIG. 4, a central portion of the main body portion 211 in the front-rear directions Y is provided with a housing portion 211b protruded upward from the placement surface 211a in the vertical directions Z. The housing portion 211b has a substantially rectangular parallelepiped shape that is parallel to the placement surface 211a and extends in supporting directions A that include the left-right directions X. A downstream-side end portion of the housing portion 211b in the left-right directions X is located more to the downstream side than a downstream-side end portion of the placement surface 211a is. A space S-side portion of the housing portion 211b has an opening 211c that allows the medium support unit 220 disposed within the housing portion 211b to be protruded upward from the housing portion 211b in the vertical directions Z.

Figure 5:
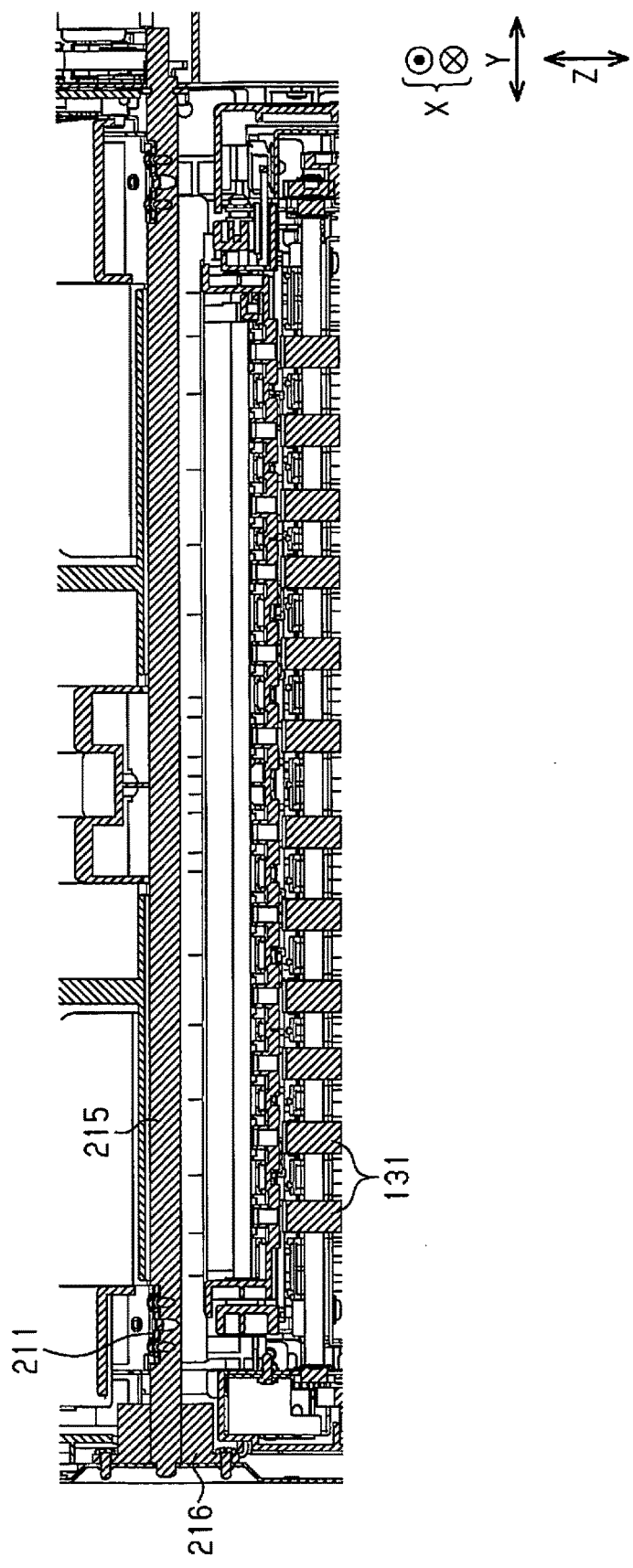
FIG. 5 is a sectional view taken on line V-V in FIG. 4.

As shown in FIG. 5, the pivot shaft 215 extends in the front-rear directions Y. The main body portion 211 is connected to the pivot shaft 215 via a bolt and the like. An end of the pivot shaft 215 is provided with a torque limiter 216 for restricting the pivoting speed. The torque limiter 216 does not restrict the pivoting speed when the discharge unit 210 pivots from the closed position P1 to the open position P2, but restricts the torque exerted on the pivot shaft 215 so that the pivoting speed does not become greater than or equal to a certain speed when the discharge unit 210 pivots from the open position P2 to the closed position P1.

As shown in FIG. 3 and FIG. 4, the medium support unit 220 has a generally rectangular parallelepiped shape that extends in the supporting directions A. The medium support unit 220 is provided on the placement surface 211a and protruded from the placement surface 211a so as to be capable of supporting the sheet P from below. The medium support unit 220 is displaceable between a maximum protruded position Q1 at which the amount of protrusion L from the placement surface 211a is the largest and a minimum protruded position Q2 (se FIGS. 6 and 7) at which the amount of protrusion L from the placement surface 211a is equal to the smallest amount of protrusion L2. A protruding direction B of the medium support unit 220 is orthogonal to the placement surface 211a.

An adjustment mechanism 230 changes the amount of protrusion L of the medium support unit 220. The adjustment mechanism 230 includes a pinion 231 connected to a vicinity of the top wall 102a of the casing 101, a rack 232 connected to the discharge unit 210 freely movably relative to the discharge unit 210, a coordination mechanism unit 240 that coordinates the rack 232 and the medium support unit 220, and an actuator 234.

The pinion 231 and the actuator 234 are disposed to the downstream side of the medium support unit 220 in the transport direction W of the sheet P and below the placement surface 211a in the protruding direction B of the medium support unit 220. Concretely, the pinion 231 and the actuator 234 are located in a portion that faces a downstream-side end portion of the housing portion 211b. The rack 232 is disposed so that its teeth 232a are aligned in the supporting directions A. An upstream-side end portion of the rack 232 is connected to a rod-shaped support portion 233 that supports the coordination mechanism unit 240.

The coordination mechanism unit 240 supports the support portion 233. The coordination mechanism unit 240 includes a first link 241 and a second link 242 that are pivotably connected. A first lower end portion 241a of the first link 241 that is lower-side end portion thereof in the protruding direction B is engaged with the rack 232 via a support portion 233 and is pivotably connected to the support portion 233. In this respect, the first lower end portion 241a of the first link 241 corresponds to a "first engaging portion that engages with the rack 232". A first upper end portion 241b of the first link 241 that is an upper-side end portion thereof in the protruding direction B is pivotably connected to an intermediate portion of the second link 242 in the protruding direction B.

A second lower end portion 242a of the second link 242 that is a lower-side end portion thereof is connected to the main body portion 211 so as to be pivotable relative to the main body portion 211. A second upper end portion 242b of the second link 242 that is an upper-side end portion thereof is engaged with the medium support unit 220 from below in the protruding direction B and thereby supports the medium support unit 220. The second upper end portion 242b of the second link 242 corresponds to a "second engaging portion that, above the first lower end portion 241a in the vertical directions Z, engages with the medium support unit 220". The second upper end portion 242b of the second link 242 is provided with a roller 242c.

The actuator 234 controls rotation of the pinion 231. The actuator 234 is, for example, an electric motor. It is preferred that the actuator 234 and the pinion 231 be connected via a deceleration mechanism. While the pinion 231 is disposed at a lower side of the housing portion 211b of the discharge unit 210, the actuator 234 and the deceleration mechanism are disposed at a rear side of the pinion 231 in the front-rear directions Y and a lower side of the top wall 102a. When the actuator 234 operates with the pinion 231 and the rack 232 engaged, the rack 232 moves along the supporting directions A due to rotation of the pinion 231. The adjustment mechanism 230 changes the amount of protrusion L by the rack 232 moving due to rotation of the pinion 231. More specifically, as the rack 232 moves, the lower end portion 241a of the first link 241 and the upper end portion 242b of the second link 242 in the coordination mechanism unit 240 move relative to each other in the protruding direction B in which the medium support unit 220 is protruded from the placement surface 211a. This changes the amount of protrusion L, which correlates with the distance between the lower end portion 241a of the first link 241 and the upper end portion 242b of the second link 242 in the protruding direction B. When the rack 232 and the pinion 231 are in mesh, the actuator 234 maintains the rotation phase of the pinion 231. Therefore, the distance between the lower end portion 241a of the first link 241 and the upper end portion 242b of the second link 242 is maintained.

Concretely, when rack 232 and the support portion 233 connected to the rack 232 move to the downstream side in the transport direction W while the medium support unit 220 is in the maximum protruded position Q1 as shown in FIGS. 3 and 4, the upper end portion 242b of the second link 242 is lowered moving to the downstream side. This reduces the distance between the lower end portion 241a of the first link 241 and the upper end portion 242b of the second link 242 and reduces the amount of protrusion L of the medium support unit 220.

Figure 6:
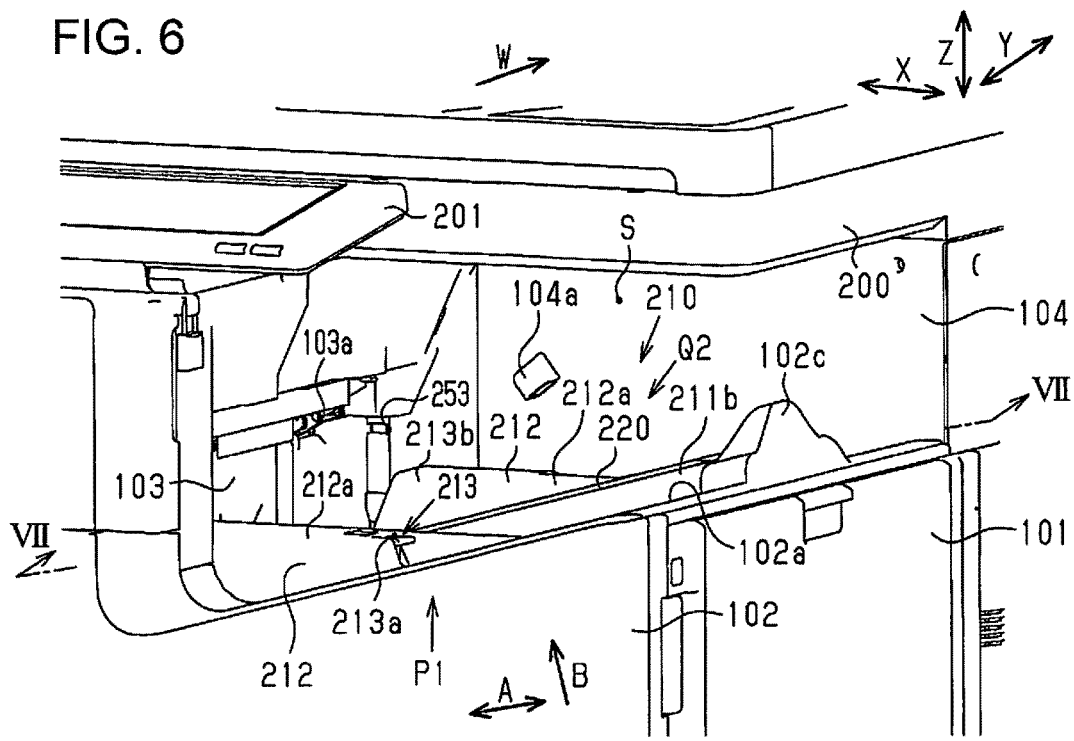
FIG. 6 is a perspective view of the printer when the discharge unit is in the closed position and the medium support unit is in a minimum protruded position.
Figure 7:
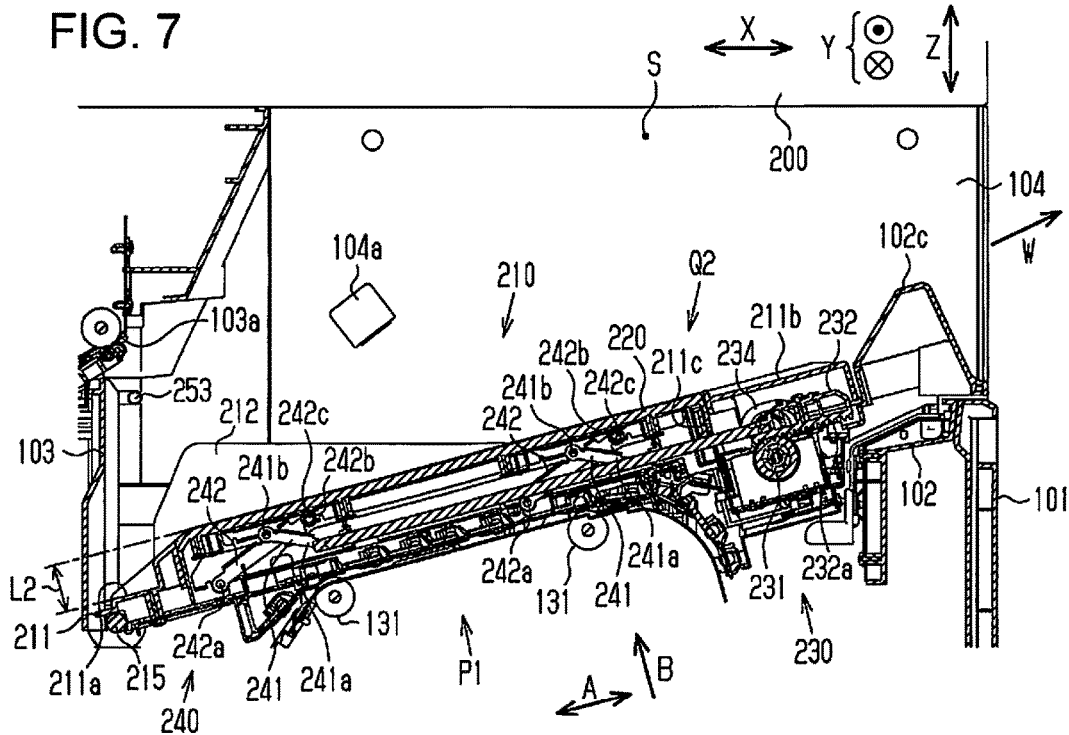
FIG. 7 is a sectional view taken on line in FIG. 6.

On the other hand, when the rack 232 and the support portion 233 connected to the rack 232 move to the upstream side in the transport direction W while the medium support unit 220 is in the minimum protruded position Q2 as shown in FIG. 6 and FIG. 7, the upper-side upper end portion 242b of the second link 242 rises moving to the upstream side. This increases the distance between the lower end portion 241a of the first link 241 and the upper end portion 242b of the second link 242 and increases the amount of protrusion L of the medium support unit 220.

The printer 100 includes a position sensor 250 that detects the position of the rack 232. The position sensor 250 is provided below the rack 232 in the protruding direction B. The position sensor 250 includes a first sensor portion 251 and a second sensor portion 252.

The first sensor portion 251 is an optical sensor and includes a light emitting unit 251a and a light receiving unit 251b. The first sensor portion 251 is connected to the main body portion 102 of the casing 101 so that a detection portion 232b that connected to the rack 232 and that moves together with the rack 232 can move between the light emitting unit 251a and the light receiving unit 251b.

The second sensor portion 252 is an optical sensor and includes a light emitting unit 252a and a light receiving unit 252b. The second sensor portion 252 is connected to the main body portion 102 of the casing 101 so that the detection portion 232b of the rack 232 can move between the light emitting unit 252a and the light receiving unit 252b. The second sensor portion 252 is disposed more to the downstream side in the supporting directions A than the first sensor portion 251 is.

Figure 9:
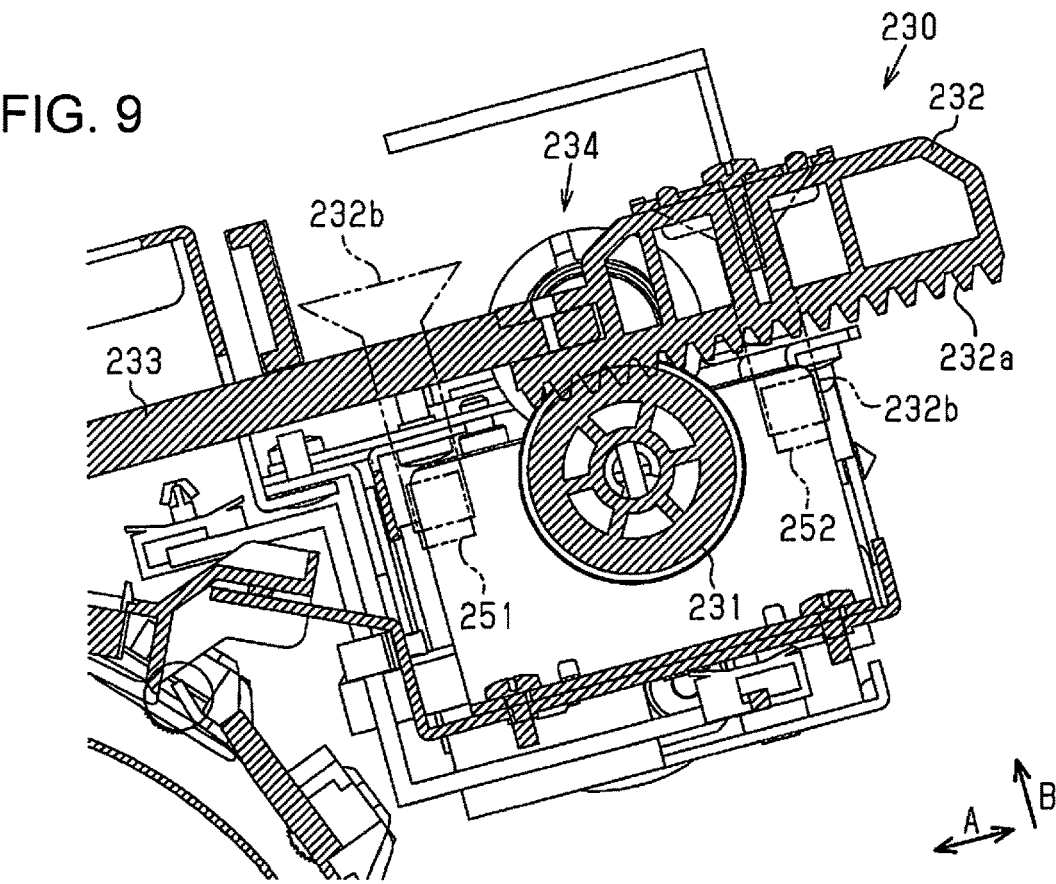
FIG. 9 is a sectional view taken on line IX-IX in FIG. 8.

As indicated in FIG. 4 and by two-dot chain lines in FIG. 9, the first sensor portion 251 is constructed so as to be capable of detecting the location of the detection portion 232b when the amount of protrusion L of the medium support unit 220 is the largest. When the detection portion 232b of the rack 232 is located between the light emitting unit 251a and the light receiving unit 251b of the first sensor portion 251, the first sensor portion 251 outputs to a control unit 300 (see FIG. 2) a signal indicating that the rack 232 is in a position that corresponds to the largest amount of protrusion L of the medium support unit 220.

As indicated in FIG. 7 and by two-dot chain lines in FIG. 9, the second sensor portion 252 is constructed so as to be capable of detecting the location of the detection portion 232b when the amount of protrusion L of the medium support unit 220 is the smallest. When the detection portion 232b of the rack 232 is located between the light emitting unit 252a and the light receiving unit 252b of the second sensor portion 252, the second sensor portion 252 outputs to the control unit 300 a signal indicating that the rack 232 is in a position that corresponds to the smallest amount of protrusion L of the medium support unit 220. Thus, the position sensor 250 is capable of detecting the position of the rack 232. The control unit 300 (see FIG. 2) computes the position of the rack 232 on the basis of the signal from the position sensor 250.

As shown in FIG. 4, the side wall 103 is provided with a stack sensor 253 that detects sheets P stacked on the discharge unit 210. The stack sensor 253 is, for example, an optical sensor, and outputs to the control unit 300 (see FIG. 2) a signal commensurate with the thickness of the stack of sheets P on the discharge unit 210, that is, the number of sheets P stacked thereon.

The control unit 300 changes the amount of protrusion L on the basis of the amount of ink ejected to sheets P, the number of sheets P stacked on the discharge unit 210 which is detected by the stack sensor 253, the curl of sheets P stacked on the discharge unit 210 which is detected by a sensor (not depicted), or the like. Due to the deposit of ink a sheet P, the sheet P curls when the ink dries. The directions of curl of sheets P vary depending on the states of the sheets P. The state of a sheet P includes, for example, the number of printed surfaces of the sheet P in the case of two-side printing or one-side printing, and the distribution of ink on the surface of the sheet P. For example, a sheet P can have a curl in which two end portions of the sheet P in the transverse directions curve upward. The medium support unit 220 supports a sheet P at a location above the placement surface 211a in the vertical directions Z. Therefore, the end portions of the sheet P in the transverse directions sink downward by gravity. Furthermore, because of blower fans (not depicted) provided in both end portions of the side wall 103 in the front-rear directions Y, end portions of a sheet P in the transverse directions are forced downward and end portions of the sheet P in the transverse directions sink downward by gravity. Therefore, regardless of the state of a sheet P, the two end portions of the sheet P in the transverse directions sink downward, so that the curl of the sheet P reduces (see FIG. 15). The greater the amount of ink ejected to a sheet P, the greater the curl of the sheet P after drying. Therefore, the control unit 300 controls the actuator 234 so that the greater the curl of a sheet P, the larger the amount of protrusion L becomes. On the other hand, the larger the amount of protrusion L, the smaller the number of sheets P stackable on the discharge unit 210. Therefore, the control unit 300 changes the amount of protrusion L according to the amount of sheets P stacked on the discharge unit 210.

Next, operations of the discharge unit 210 will be described.

When the discharge unit 210 is in the closed position P1, the pinion 231 and the rack 232 of the adjustment mechanism 230 mesh so as to maintain the distance between the lower end portion 241a of the first link 241 and the upper end portion 242b of the second link 242.

Figure 13:
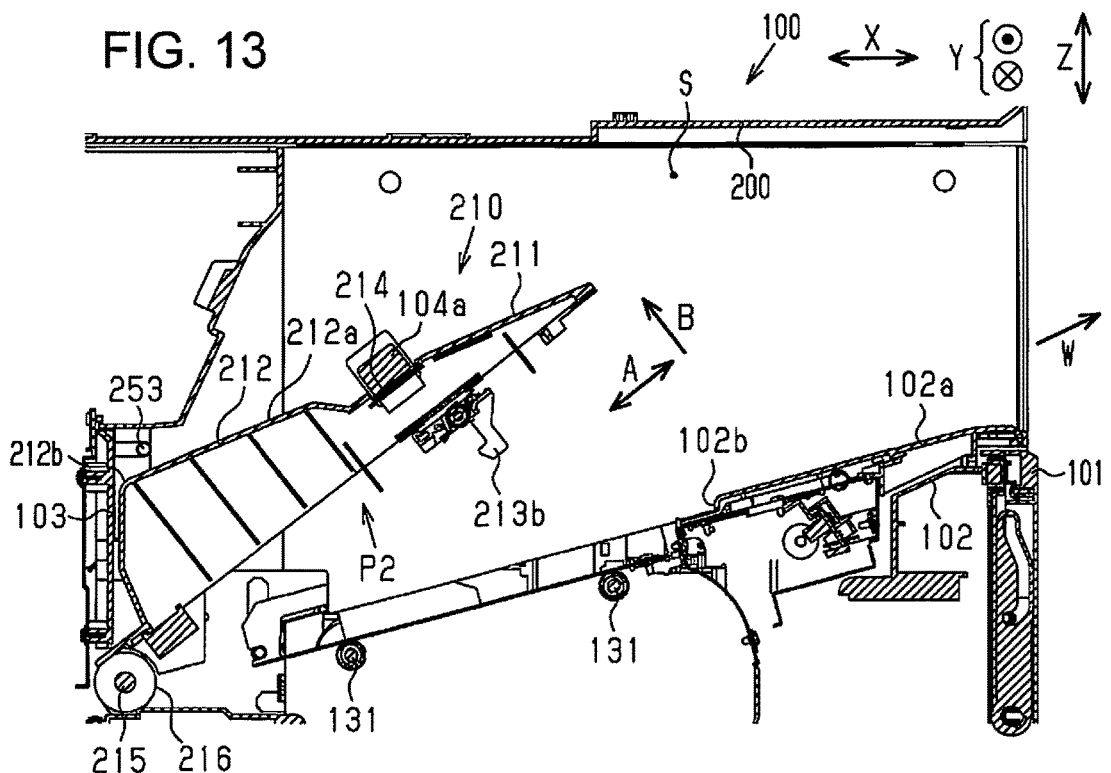
FIG. 13 is a sectional view taken on line XIII-XIII in FIG. 11.

When a user raises the operating portion 213a of the closure-side engaging portion 213 provided in the restriction portion 212, the engagement between the hook 213b and the top wall 102a is released and the discharge unit 210 is pivoted about the pivot shaft 215. Therefore, the discharge unit 210 can be moved from the closed position P1 shown in FIG. 4 or FIG. 7 to the maximum open position P2 shown in FIG. 10. When the discharge unit 210 is in the maximum open position P2, the magnet of the open-side engaging portion 214 of the restriction portion 212 shown in FIG. 13 is attracted to the passive engagement portion 104a of the support wall 104 so that the discharge unit 210 is held in the maximum open position P2.

Figure 10:
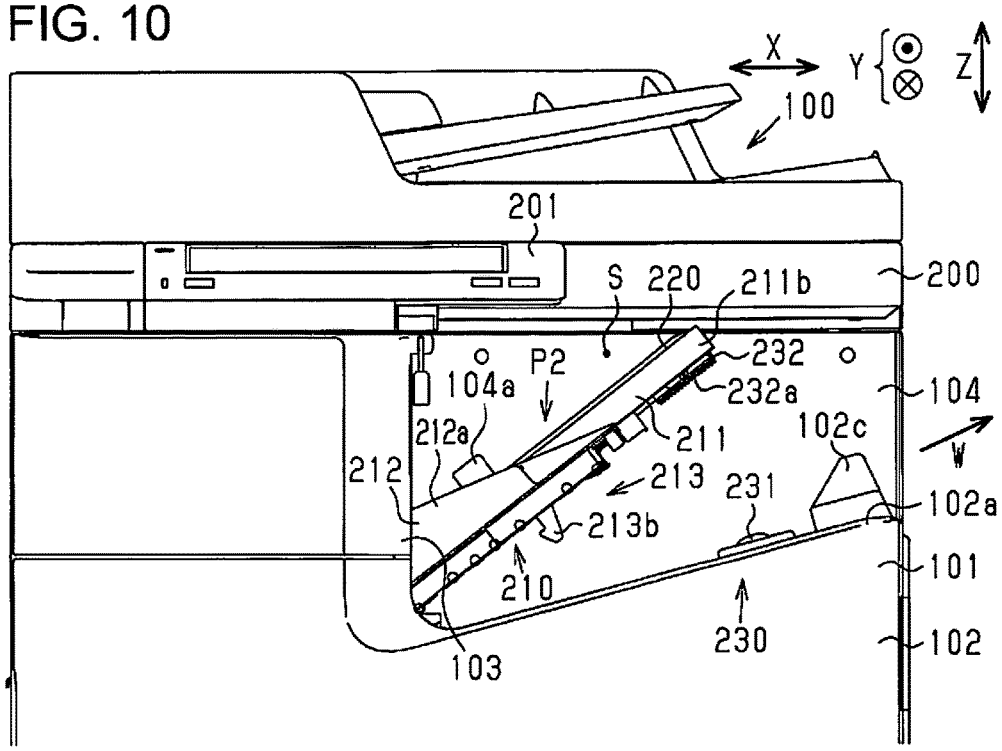
FIG. 10 is a front view of the printer when the discharge unit is in an open position and the medium support unit is in the minimum protruded position.

Note that when the discharge unit 210 is pivoted from the closed position P1 to the open position P2 as shown in FIG. 10, the rack 232 connected to the discharge unit 210 is apart from the pinion 231. That is, the meshed state between the rack 232 and the pinion 231 has discontinued. Therefore, the position of the rack 232 in the supporting directions A becomes movable independently of the rotation phase of the pinion 231. At this time, the medium support unit 220 moves by its own weight in such a direction that the amount of protrusion L decreases. Specifically, when the discharge unit 210 is in the open position P2, the rack 232 released from the mesh with the pinion 231 moves on the basis of the load from the medium support unit 220. Then, as the lower end portion 241a of the first link 241 and the upper end portion 242b of the second link 242 in the coordination mechanism unit 240 are moved relative to each other in such a direction that the distance therebetween decreases, the amount of protrusion L of the medium support unit 220 decreases. Therefore, when the discharge unit 210 is in the open position P2, the amount of protrusion L of the medium support unit 220 from the placement surface 211a is less than the amount of protrusion L thereof from the placement surface 211a when the maximum protruded position Q1. The amount of protrusion L at the time of the discharge unit 210 being in the open position P2 is determined by the relation between the load of the discharge unit 210 and the resisting load (due to friction and the like) of the coordination mechanism unit 240 when the medium support unit 220 does not receive any external force. When the load of the discharge unit 210 is sufficiently larger than the resisting load of the coordination mechanism unit 240 or when external force is applied to the medium support unit 220, the amount of protrusion L becomes minimum.

Thus, the amount of protrusion L of the medium support unit 220 can be changed by the adjustment mechanism 230 when the discharge unit 210 is in the closed position P1, and the amount of protrusion L can be changed by external force independently of the adjustment mechanism 230 when the discharge unit 210 is in the open position P2. The aforementioned external force includes the weight of sheets P placed in the discharge unit 210, the pressure from the scanner unit 200 via sheets P stacked on the discharge unit 210 when the stack of the sheets P contacts the scanner unit 200, etc. Provided that the amount of protrusion L of the medium support unit 220 is less than the maximum amount of protrusion L1, the medium support unit 220 does not interfere with the scanner unit 200 even when the discharge unit 210 is in the maximum open position P2.

Figure 11:
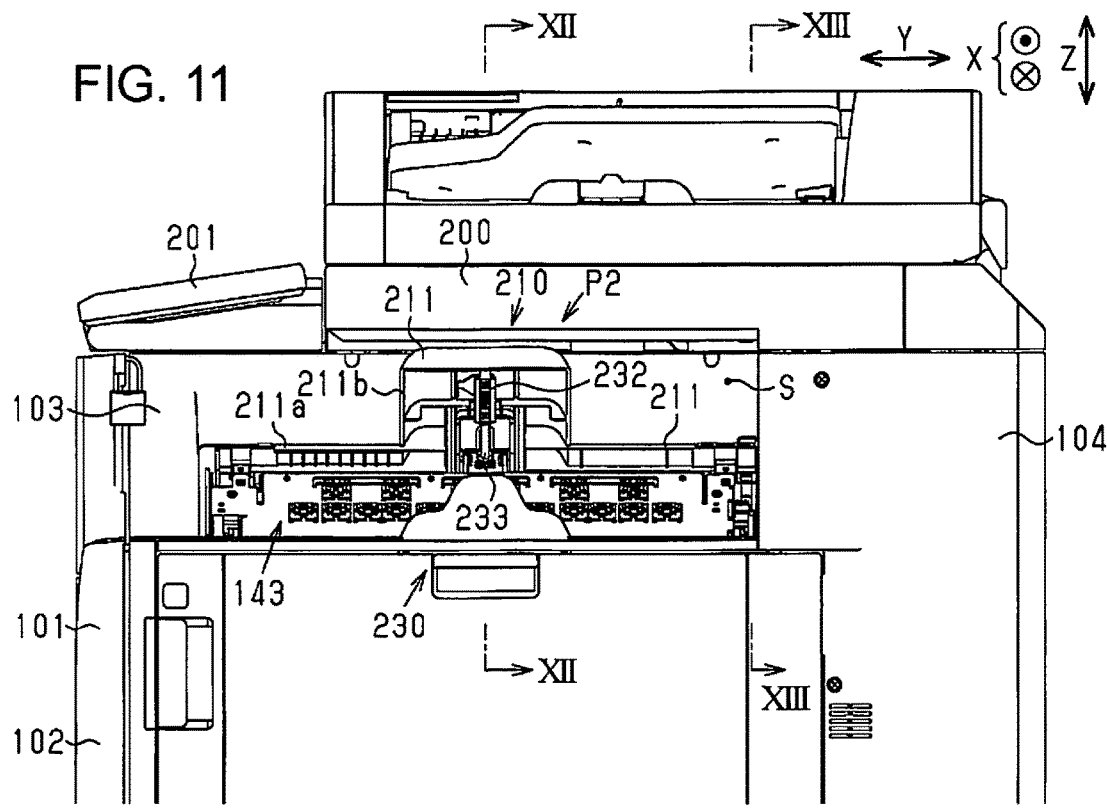
FIG. 11 is a side view of the printer when the discharge unit is in the open position and the medium support unit is in the minimum protruded position.
Figure 12:
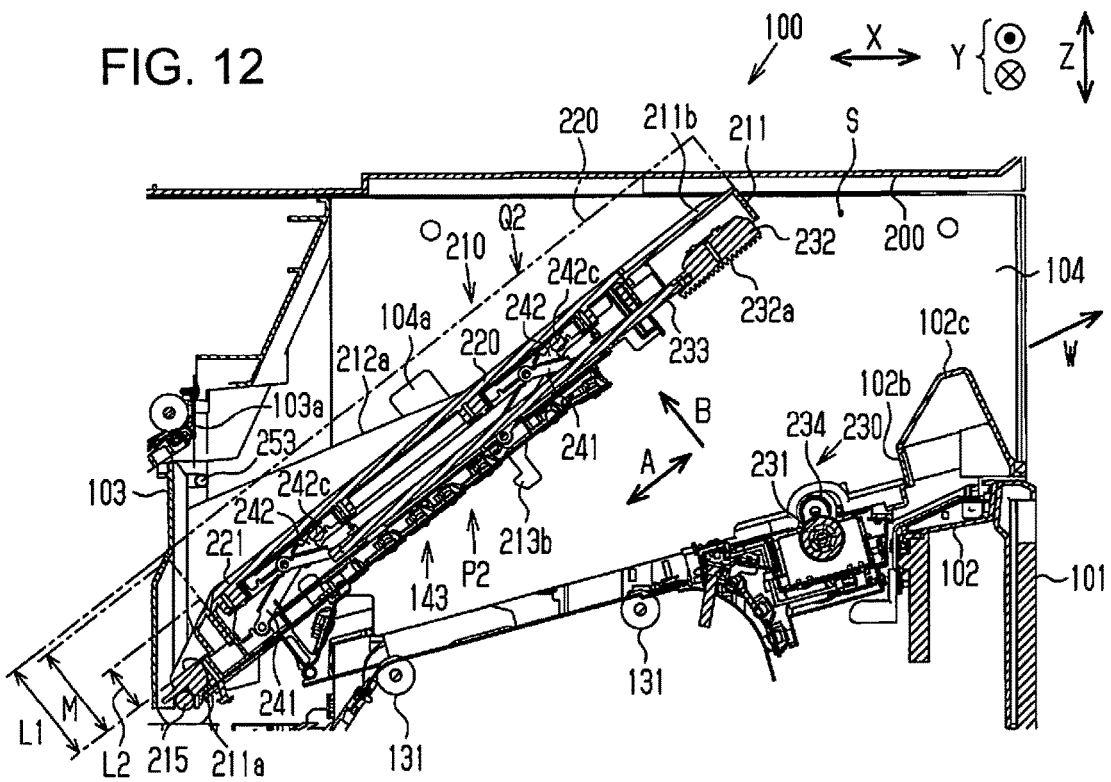
FIG. 12 is a sectional view taken on line XII-XII in FIG. 11.

As shown in FIG. 11 and FIG. 12, when the discharge unit 210 is in the open position P2, the feed path 143 is opened as well as the discharge unit 210. Therefore, the user can perform maintenance such as removal of a sheet P stuck in the feed path 143. Furthermore, maintenance of the printing unit 110 located below the feed path 143 in the vertical directions Z becomes possible. To perform maintenance of the printing unit 110, the scanner unit 200 and the open-side engaging portion 214 can be detached from the casing 101, so that the discharge unit 210 is allowed to be pivoted to a position that is further in the opening direction than the maximum open position P2. In this case, the movement of the discharge unit 210 about the pivot shaft 215 is restricted by contact of the medium support unit 220 or the restriction portion 212 with the side wall 103. The rotation angle of the pivot shaft 215 from the closed position P1 is, for example, about 50 degrees.

As shown by a two-dot chain line in FIG. 12, the medium support unit 220 has an upstream-side end portion 221 that is at a side that is the nearest to the discharge opening 103a. The maximum amount of protrusion L1 of the upstream-side end portion 221 is larger than the distance M between the side wall 103 and an upstream-side portion of the placement surface 211a in which an upstream-side end portion 221 is provided when the discharge unit 210 is in the maximum open position P2. When the discharge unit 210 is in the maximum open position P2, the amount of protrusion L of the medium support unit 220 is smaller than the distance M. Therefore, the medium support unit 220 does not interfere with the side wall 103.

As shown in FIG. 13, the restriction portions 212 are constructed so that, when the discharge unit 210 is in the maximum open position P2, an upstream-side end portion 212b of each restriction portion 212 in the transport direction W is out of contact with the side wall 103. Therefore, the upstream-side end portions 212b of the restriction portions 212 do not restrict the pivot range of the discharge unit 210.

Figure 8:
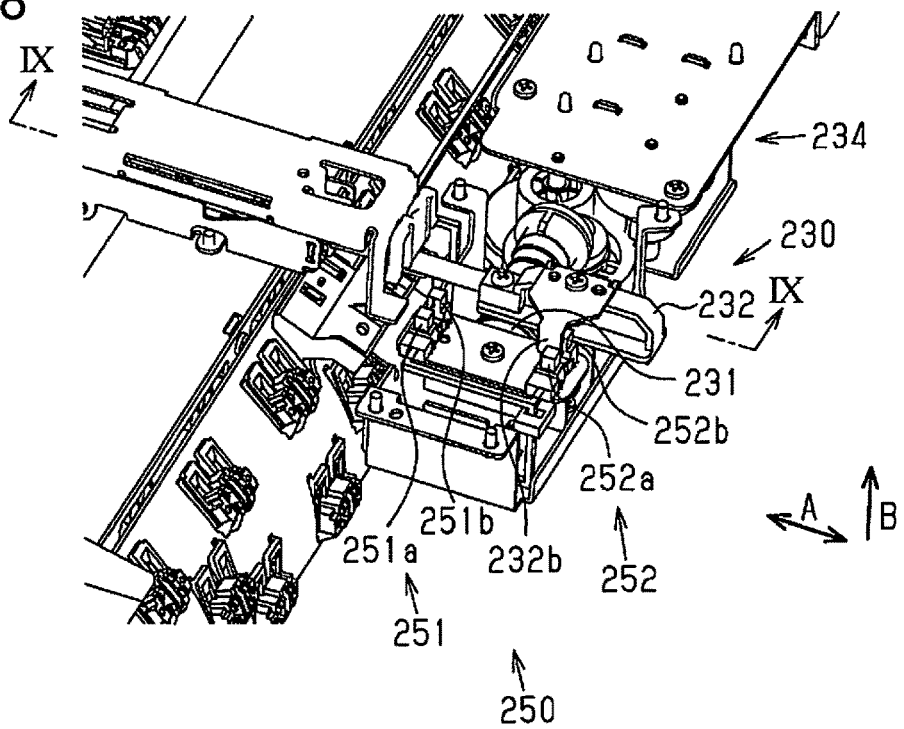
FIG. 8 is a perspective view of a position sensor.

The control unit 300 detects the position of the rack 232 when the discharge unit 210 is returned from the open position P2 to the closed position P1. Concretely, when the discharge unit 210 is returned from the open position P2 to the closed position P1, the control unit 300 controls the actuator 234 so that the rack 232 is moved to the downstream side in the transport direction W. When the second sensor portion 252 shown in FIG. 8 detects the detection portion 232b of the rack 232, the control unit 300 determines that the rack 232 has moved to a position that corresponds to the maximum amount of protrusion L of the medium support unit 220, and then stops driving the actuator 234 and maintains the position of the rack 232. After that, the control unit 300 changes the amount of protrusion L on the basis of the amount of ink ejected to the sheets P stacked on the discharge unit 210, the number of the sheets P stacked thereon, the curl of the sheets P, etc.

Figure 14:
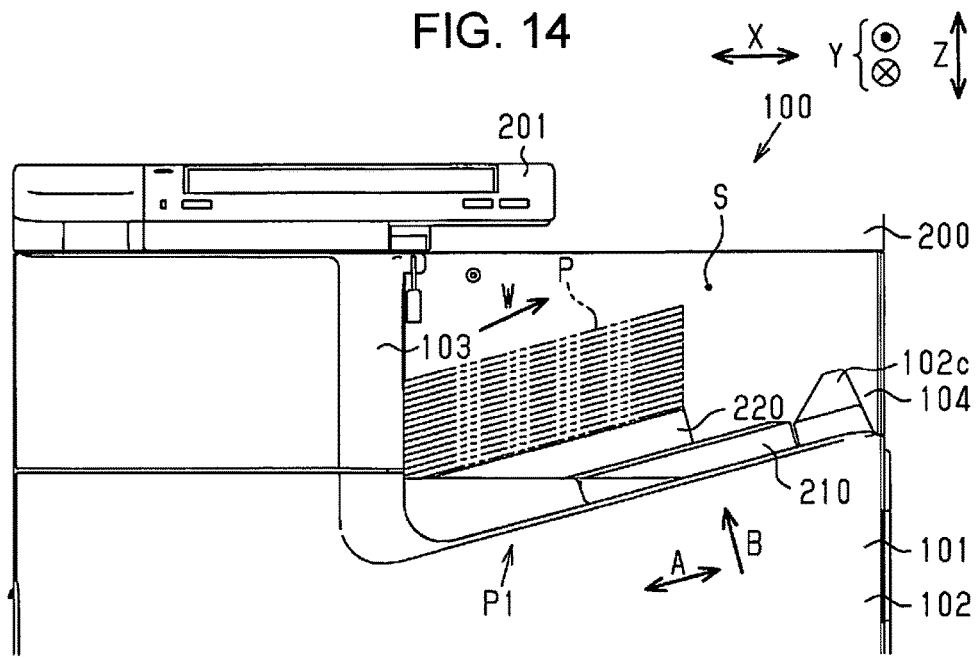
FIG. 14 is a front view of a printer when the discharge unit is loaded with sheets of paper.
Figure 15:
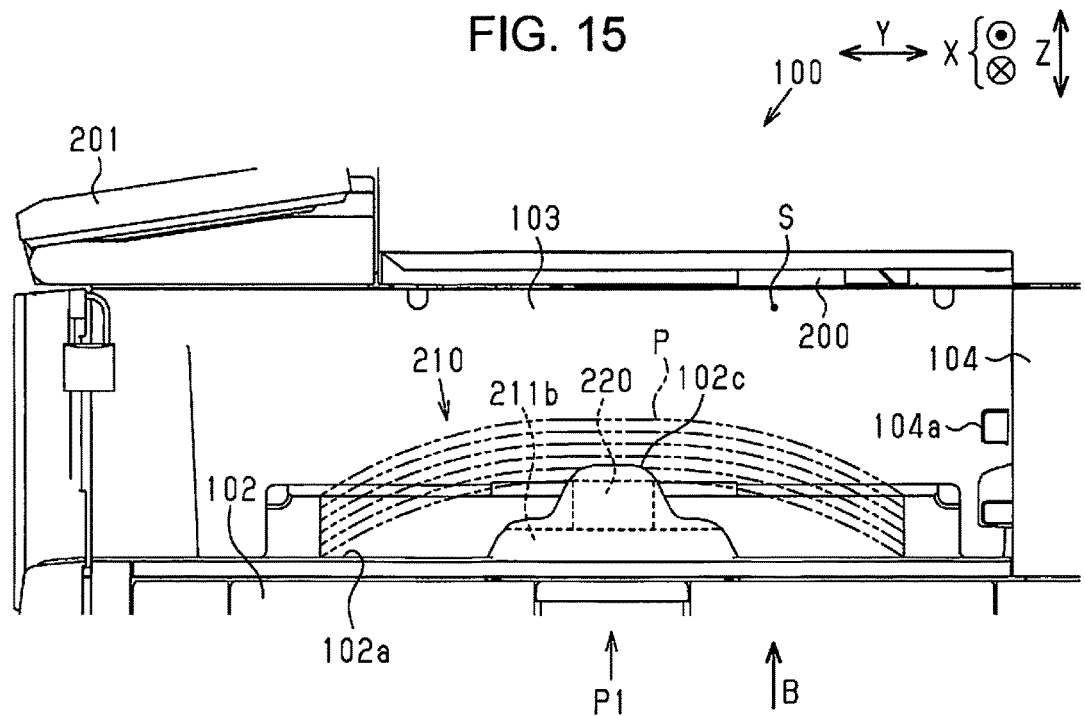
FIG. 15 is a side view of the printer when the discharge unit is loaded with sheets.

As shown in FIGS. 14 and 15, a common size of sheet P (e.g., an A4-size sheet) that is printed by the printer 100 is transported along the transport path 120 in such a manner that the shorter sides of the sheet P are parallel to the transport direction W, and then is supported at its central portion in its transverse directions (the front-rear directions Y) in the discharge unit 210 by the medium support unit 220. Therefore, when the sheet P is put in the discharge unit 210, the both ends of the sheet P in the front-rear directions Y tend to sink downward in the vertical directions Z. Therefore, the upward curling of both ends of the sheet P in the transverse directions is reduced.

Figure 16:
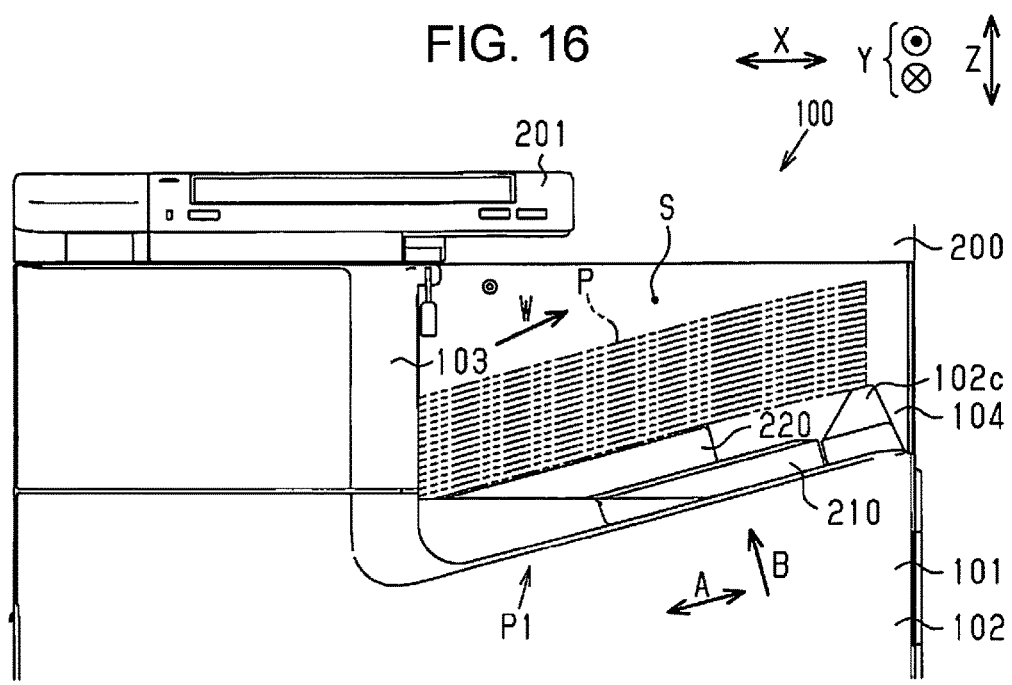
FIG. 16 is a front view of the printer when the discharge unit is loaded with sheets larger than the sheets in FIG. 14.
Figure 17:
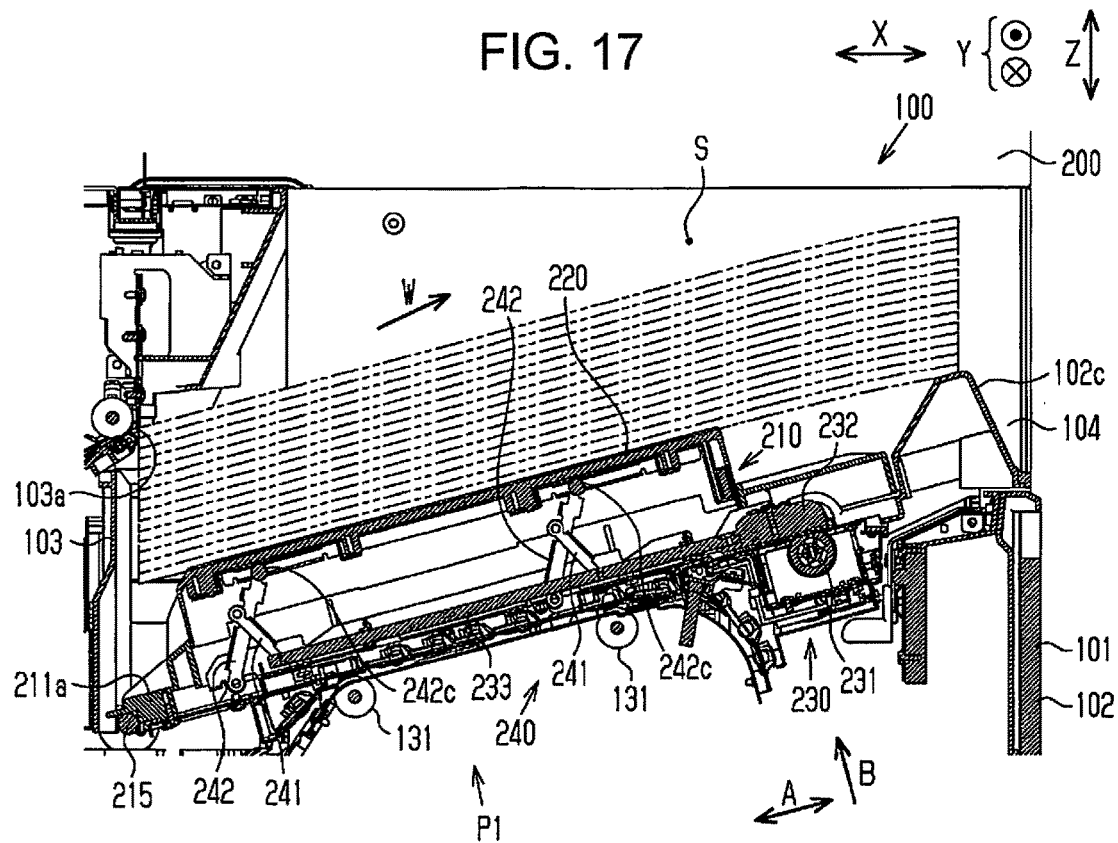
FIG. 17 is a sectional view of the printer when the discharge unit is loaded with sheets larger than the sheets in FIG. 14.

As shown in FIGS. 16 and 17, a sheet larger than a common-size sheet P printed by the printer 100 (e.g., an A3-size sheet) is transported along the transport path 120, with the long sides of the sheet being parallel to the transport direction W, and then is supported at its central portion in its transverse directions in the discharge unit 210 by the medium support unit 220. Therefore, when the sheet is put in the discharge unit 210, the both ends of the sheet in the front-rear directions Y tend to sink downward in the vertical directions Z. Therefore, the upward curling of both ends of the sheet P in the transverse directions is reduced. A downstream-side end portion of the sheet P in the transport direction W is supported by the medium contact portion 102c. The curling or the like of a downstream-side end portion of the sheet P in the transport direction W is inhibited.

The foregoing exemplary embodiment of the disclosure achieve the following advantageous effects.

(1) In the case where the discharge unit 210 is provided with a portion protruded upward from the placement surface 211a, the protruded portion can interfere with the scanner unit 200 and thus restrict the pivot range of the discharge unit 210. However, in this printer 100, when the discharge unit 210 is in the open position P2, the amount of protrusion L of the medium support unit 220 protrudable from the placement surface 211a which is measured from the placement surface 211a is less than the maximum amount of protrusion L1. The thus-reduced amount of protrusion L correspondingly increases the pivot range. This makes it easier for the user to perform maintenance. Furthermore, the size increase of the printer 100 can be inhibited in comparison with the case where the mounting location of the scanner unit 200 in the vertical directions Z is changed so as to increase the space S in the vertical directions Z and therefore increase the pivot range.

Furthermore, when the discharge unit 210 carrying thereon a sheet P is pivoted from the closed position P1 to the open position P2, a large amount of protrusion L of the medium support unit 220 can pose a risk of, for example, an upstream-side end portion of the sheet P being nipped and bent between the medium support unit 220 and the side wall 103. However, in this printer 100, when the discharge unit 210 is in the open position P2, the amount of protrusion L is less than the maximum amount of protrusion L1, so that such bending or the like of the sheet P is less likely to occur.

(2) When the discharge unit 210 is in the closed position P1, the amount of protrusion L of the medium support unit 220 can be adjusted by the pinion 231 being rotated to move the rack 232 and therefore change the distance between the first lower end portion 241a of the first link 241 and the second upper end portion 242b of the second link 242 in the coordination mechanism unit 240. On the other hand, when the discharge unit 210 is in the open position P2, the amount of protrusion L of the medium support unit 220 becomes smaller as the rack 232, released from mesh with the pinion 231, moves on the basis of the load from the medium support unit 220 while the coordination mechanism unit 240 is operated so that the distance between the first lower end portion 241a and the second upper end portion 242b decreases. Therefore, there is no particular need to provide a mechanism that, for example, detects the position of the discharge unit 210 and, on the basis of the detection signal, drives an actuator so as to adjust the amount of protrusion L of the medium support unit 220, and therefore the apparatus construction can be simplified.

(3) According to the printer 100, the pinion 231 is disposed to the downstream side of the medium support unit 220 in the transport direction W on the placement surface 211a. That is, since the pinion 231 is disposed near an end of the placement surface 211a, arrangement of members disposed below the placement surface 211a (e.g., the transport roller pairs 131 of the third feed path 143, a drive source of the driving roller pair 148, etc.) is not easily restricted.

(4) The farther the upstream-side end portion 221 of the medium support unit 220 is from the side wall 103 having the discharge opening 103a, the less the effect of the medium support unit 220 in inhibiting the curling of an upstream-side end portion of the sheet P. On the other hand, when the upstream-side end portion 221 of the medium support unit 220 is near the side wall 103, there is a risk that the upstream-side end portion 221 of the medium support unit 220 may interfere with the side wall 103 when the discharge unit 210 is pivoted and therefore the pivot range of the discharge unit 210 may become smaller.

In this respect, as for the printer 100, the maximum amount of protrusion L1 of the upstream-side end portion 221 of the medium support unit 220 which is the nearest side portion of the medium support unit 220 to the discharge opening 103a is larger than the distance between the side wall and an upstream-side portion of the placement surface 211a which is adjacent to the upstream-side end portion 221 when the discharge unit 210 is in the maximum open position P2. Therefore, by reducing the amount of protrusion L of the medium support unit 220 when the discharge unit 210 is in the maximum open position P2, it becomes possible to bring the medium support unit 220 close to the side wall 103 and, at the same time, substantially prevent the pivot range of the discharge unit 210 from becoming smaller.

(5) Since the printer 100 is equipped with the medium contact portion 102c, even a large-size sheet P whose downstream-side end portion reaches a location downstream of the medium support unit 220 after printing is performed can be supported by the medium contact portion 102c. Therefore, the downstream-side end portion of the sheet P is inhibited from curving.

The foregoing exemplary embodiment can be modified into different exemplary embodiments as follows.

In the foregoing exemplary embodiment, the adjustment mechanism 230, the pinion 231, and the actuator 234 can be mounted in the discharge unit 210. In such an exemplary embodiment, the control unit 300 controls the amount of protrusion L according to the output of a sensor that detects whether the discharge unit 210 is in the open position P2. Concretely, when the discharge unit 210 is in the open position P2, the control unit 300 controls the amount of protrusion L so that the amount of protrusion L is less than the maximum amount of protrusion L1. In this exemplary embodiment, the amount of protrusion L can also be changed according to the rotation angle of the pivot shaft 215.

In the foregoing exemplary embodiment, the pinion 231 and the actuator 234 can be provided below the medium support unit 220 or at an outer side of the medium support unit 220 in the front-rear directions Y. In the construction where the pinion 231 and the actuator 234 are provided below the medium support unit 220, the pinion 231 and the actuator 234 at least partially overlap the medium support unit 220 in the transport direction W.

In the foregoing exemplary embodiment, the maximum amount of protrusion L of the upstream-side end portion 221 of the medium support unit 220 may be less than or equal to the distance between the side wall 103 and an upstream-side portion of the placement surface 211a which is adjacent to the upstream-side end portion 221 of the medium support unit 220 when the discharge unit 210 is in the maximum open position P2. In this construction, the medium support unit 220 and the side wall 103 do not interfere with each other in the pivot range between the closed position P1 and the maximum open position P2.

In the exemplary embodiment, the medium contact portion 102c may be continuous with the medium support unit 220 in the transport direction W.

In the exemplary embodiment, the medium contact portion 102c may be omitted. In this case, if the medium support unit 220 is lengthened to the downstream side in the transport direction W, curl of a downstream-side end portion of a large-side sheet P can be inhibited. Furthermore, in this case, the pinion 231 and the actuator 234 may be provided below the medium support unit 220.

In the exemplary embodiment, for the printing unit 110 to perform printing on a sheet P, a construction in which an outer peripheral surface of the belt 135 of the belt transport unit 132 functions as a support surface to support the sheet P is not restrictive; for example, a construction in which a support table is provided and an upper surface of the support table in the vertical directions Z functions as a support surface to support the sheet P is also allowed.

In the exemplary embodiment, the transport unit 130 that transports the sheet P along the transport path 120 is not limited to the transport roller pairs 131 but may be, for example, constructed of a conveyor.

In the exemplary embodiment, the print head 111 of the printing unit 110 is not limited to a line head but may also be a serial head that is movable in the transverse directions of the sheet P which intersect the transport direction W.

In the exemplary embodiment, the printing apparatus may be a fluid ejecting apparatus that performs printing by ejecting or discharging a fluid other than ink (e.g., a liquid, a liquid material made by dispersing or mixing particles of a functional material in a liquid, or a fluidal material such as a gel). For example, the printing apparatus may be a liquid material ejecting apparatus that performs printing by ejecting a liquid material that contains in a dispersed or dissolved state a material, such as an electrode material or a color material (pixel material), for use in, for example, production of a liquid crystal display, an EL (electroluminescence) display, or a surface emitting display. Furthermore, the printing apparatus may also be a fluidal material ejecting apparatus that ejects a fluidal material such as a gel (e.g., a physical gel). The disclosure is applicable to any one of these types of fluid ejecting apparatuses. Note that in this specification, the term "fluid" does not include a fluid that is made up of only gas and includes, for example, liquids (including inorganic solvents, organic solvents, solutions, liquid resins, liquid metals (metal melts), etc.), liquid materials, and fluidal materials, etc.

What is claimed is:

1. A printing apparatus comprising:
    a printing unit that performs printing on a medium;
    a casing that houses the printing unit;
    a scanner unit disposed in an upper portion of the casing; and
    a discharge unit that is disposed below the scanner unit in a vertical direction, and that is connected to the casing pivotably between a closed position in which the discharge unit is farthest from the scanner unit and an open position in which the discharge unit is nearer to the scanner unit than in the closed position, and that the medium having been subjected to printing by the printing unit is discharged to, wherein the discharge unit includes a placement surface on which the medium is put and a medium support unit capable of supporting the medium from below while in a state of being protruded from the placement surface, and wherein the medium support unit is displaceable between a maximum protruded position in which amount of protrusion of the medium support unit from the placement surface is largest and a minimum protruded position in which the amount of protrusion of the medium support unit from the placement surface is smallest, and wherein the amount of protrusion of the medium support unit from the placement surface when the discharge unit is in the open position is less than the amount of protrusion of the medium support unit in the maximum protruded position from the placement surface.

2. The printing apparatus according to claim 1, further comprising:

a pinion connected to the casing;

a rack that is movably connected to the discharge unit and that comes out of mesh with the pinion when the discharge unit is pivoted from the closed position to the open position; and a coordination mechanism unit that includes, in a mechanism that coordinates the rack and the medium support unit, a first engaging portion that engages with the rack and a second engaging portion that, above the first engaging portion in the vertical direction, engages with the medium support unit, the first engaging portion and the second engaging portion moving relative to each other in a protruding direction of the medium support unit from the placement surface as the rack moves, wherein when the discharge unit is in the closed position, the amount of protrusion of the medium support unit changes as the rack is moved with rotation of the pinion so that the first engaging portion and the second engaging portion are moved relative to each other, and when the discharge unit is in the open position, the amount of protrusion of the medium support unit becomes smaller as the rack out of the mesh with the pinion moves based on load from the medium support unit so that the first engaging portion and the second engaging portion are relatively moved in such a direction that distance between the first engaging portion and the second engaging portion becomes smaller.

3. The printing apparatus according to claim 2, wherein the pinion is disposed below the placement surface in the protruding direction of the medium support unit, at a location to the downstream side of the medium support unit in the transport direction of the medium.

4. The printing apparatus according to claim 1, wherein the discharge unit moves between the open position and the closed position by pivoting about an upstream-side end portion of the discharge unit in a transport direction of the medium which serves as a pivot axis.

5. The printing apparatus according to claim 4, wherein a downstream-side end portion of the medium support unit in the transport direction of the medium is disposed further to an upstream side in the transport direction of the medium than a downstream-side end portion of the discharge unit in the transport direction of the medium is.

6. The printing apparatus according to claim 1, wherein the medium support unit protrudes from the placement surface in a central portion of the discharge unit in a direction that intersects the transport direction of the medium.

7. The printing apparatus according to claim 1, wherein:

the open position includes a maximum open position in which the discharge unit is nearest to the scanner unit;

the casing includes a side wall that is located to the upstream side of the discharge unit in the transport direction of the medium and that has a discharge opening through which the medium is discharged to the discharge unit;

the medium support unit includes an upstream-side end portion at a nearest side of the medium support unit to the discharge opening;

the placement surface has an upstream-side portion that is adjacent to the upstream-side end portion; and the largest amount of protrusion of the upstream-side end portion is larger than the distance between the side wall and the upstream-side portion in the protruding direction of the medium support unit when the discharge unit is in the maximum open position.

8. The printing apparatus according to claim 1, wherein the casing has, to the downstream side of the medium support unit in the transport direction of the medium, a medium contact portion that is protruded upward from the placement surface.

9. A control method for a printing apparatus that includes:

a printing unit that performs printing on a medium;

a casing that houses the printing unit;

a scanner unit disposed in an upper portion of the casing; and a discharge unit that is disposed below the scanner unit in a vertical direction, and that is connected to the casing pivotably between a closed position in which the discharge unit is farthest from the scanner unit and an open position in which the discharge unit is nearer to the scanner unit than in the closed position, and that the medium having been subjected to printing by the printing unit is discharged to, wherein the discharge unit includes a placement surface on which the medium is put and a medium support unit that is capable of supporting the medium from below while in a state of being protruded from the placement surface and that is displaceable between a maximum protruded position in which amount of protrusion of the medium support unit from the placement surface is largest and a minimum protruded position in which the amount of protrusion of the medium support unit from the placement surface is smallest, the control method comprising controlling the amount of protrusion of the medium support unit from the placement surface when the discharge unit is in the open position so that the amount of protrusion is less than the amount of protrusion of the medium support unit in the maximum protruded position from the placement surface.

* * * * *